(12) United States Patent
Elgin

(10) Patent No.: US 7,753,430 B1
(45) Date of Patent: Jul. 13, 2010

(54) MOTORCYCLE WIND DEFLECTOR

(76) Inventor: Scott Elgin, 2950 Warren Rd., Indiana, PA (US) 15701

( * ) Notice: Subject to any disclaimer, the term of this patent is extended or adjusted under 35 U.S.C. 154(b) by 0 days.

(21) Appl. No.: 12/274,405

(22) Filed: Nov. 20, 2008

(51) Int. Cl.
 *B62J 17/06* (2006.01)
(52) U.S. Cl. .................................. 296/78.1; 296/180.1
(58) Field of Classification Search ............. 296/180.1, 296/77.1, 78.1, 84.1, 90, 95.1; D12/114, D12/126, 182, 185, 186
See application file for complete search history.

(56) References Cited

U.S. PATENT DOCUMENTS

| | | | | |
|---|---|---|---|---|
| 1,534,067 | A * | 4/1925 | Owen ......................... | 296/78.1 |
| RE23,039 | E * | 9/1948 | Comiskey ................... | 296/78.1 |
| 3,801,152 | A * | 4/1974 | Tims et al. ................. | 296/78.1 |
| 4,136,890 | A | 1/1979 | Vertucci | |
| 5,044,536 | A * | 9/1991 | Gleason ...................... | 224/412 |
| 5,658,035 | A | 8/1997 | Armstrong | |
| 5,758,889 | A * | 6/1998 | Ledakis ................... | 280/47.38 |
| 5,788,313 | A * | 8/1998 | Willey ........................ | 296/78.1 |
| 6,042,171 | A * | 3/2000 | Hesse ......................... | 296/78.1 |
| 6,176,538 | B1 | 1/2001 | Lawson et al. | |
| D438,496 | S | 3/2001 | Guertin | |
| D474,431 | S | 5/2003 | Hyndman et al. | |
| 6,679,537 | B1 * | 1/2004 | Putnam, Jr. ................ | 296/78.1 |
| 6,808,219 | B2 | 10/2004 | Barber et al. | |
| D521,430 | S * | 5/2006 | Metz ........................ | D12/182 |
| 7,178,858 | B1 * | 2/2007 | Hesse ...................... | 296/180.1 |
| D542,719 | S | 5/2007 | Miller | |
| 7,360,819 | B1 | 4/2008 | Hahne | |
| 7,374,007 | B2 | 5/2008 | Hasegawa et al. | |
| 2002/0074820 | A1 * | 6/2002 | Gagne ......................... | 296/92 |
| 2006/0208522 | A1 * | 9/2006 | Gray et al. ................. | 296/78.1 |
| 2007/0126254 | A1 * | 6/2007 | Bugni ....................... | 296/78.1 |
| 2007/0296237 | A1 | 12/2007 | Anderson | |

OTHER PUBLICATIONS

"Sage Brush Engine Guard Chaps", printed from the Wayback Machine internet archive, archived on Feb. 6, 2005.*

* cited by examiner

*Primary Examiner*—Jason S Morrow
(74) *Attorney, Agent, or Firm*—William F. Lang, IV; Lang Patent Law LLC

(57) ABSTRACT

A motorcycle wind deflector is removably secured to each crash bar of a motorcycle, extending upward from the crash bar. The wind deflector is secured to the crash bar in a manner that permits a leather or fabric splash guard to be simultaneously attached to the crash bar. The wind deflector extends upward a sufficient distance to deflect wind away from a rider's legs, while remaining sufficiently small to avoid creating an unattractive appearance for the motorcycle. The entire guard assembly may be removed and stowed in a saddle bag or other similar container when not in use.

10 Claims, 3 Drawing Sheets

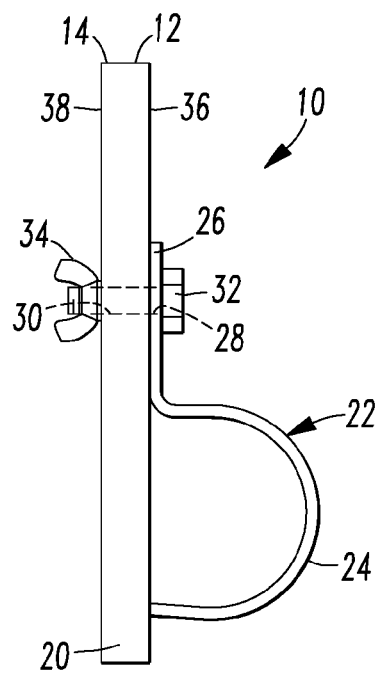
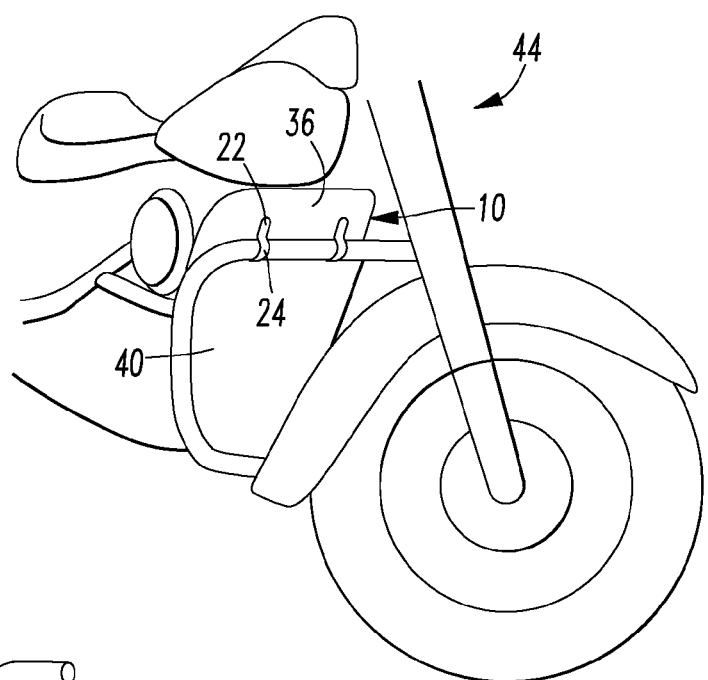
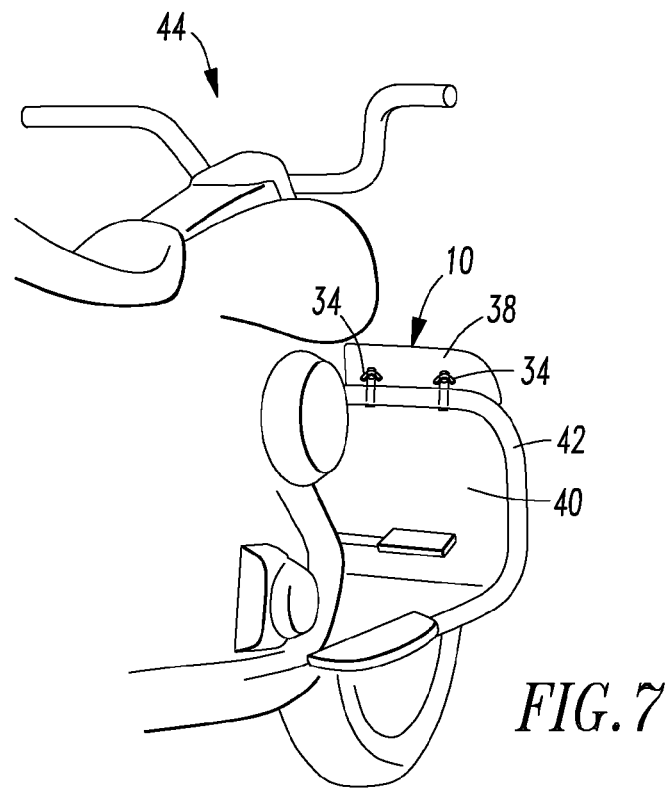
FIG.5
FIG.6
FIG.7

MOTORCYCLE WIND DEFLECTOR

TECHNICAL FIELD

The present invention relates to motorcycle wind deflectors. More specifically, the invention provides a wind deflector extending upward from the crash bar of a motorcycle.

BACKGROUND INFORMATION

Motorcycle riders are subject to significant wind as they ride. This wind not only causes discomfort for the rider, particularly in cold weather, but can also increase fatigue during long trips. Furthermore, motorcyclists may be subject to water splashed upward from the road, mud or dirt, and insects as they ride.

To address these problems, various deflectors and guards have been developed. One example is disclosed in U.S. Pat. No. 4,136,892, issued to N. E. Vertucci on Jan. 30, 1979. The leg shield disclosed therein is secured to the crash bar of a motorcycle by a plurality of semicircular clamps, as well as bolts passing through holes provided within the shield and to the crash bar. The size and the bulk of this leg shield would make it unattractive to most motorcyclists. Attaching the shield to the crash bar would require that holes be made in the crash bar. Furthermore, the shield could not easily be removed and stowed in a saddlebag were other container melted on the motorcycle when use is not desired.

U.S. Pat. No. 6,042,171, issued to W. T. Hesse on Mar. 28, 2000, discloses another deflector for use with motorcycles. This deflector includes an upper portion in secured to the front fork of the motorcycle, and a lower panel mounted on the frame of the motorcycle. This deflector could not be quickly and easily removed it from the motorcycle when use is not desired.

U.S. D438,496, issued to J. W. Guertin on Mar. 6, 2001, discloses a splash guard that attaches to the roll bar of the motorcycle. The splash guard is made from cloth or leather, making the guard easy to stow in a saddlebag when use is not desired. Additionally, the minimized size of the guard helps to make the appearance acceptable to many motorcyclists. However, this splash guard fails to extend high enough to shield a motorcyclist's legs from wind and debris.

A detachable windshield is disclosed in U.S. Pat. No. 6,808,219, which was issued to J. N. Barber et al. on Oct. 26, 2004. The windshield is secured to the fork tubes of a motorcycle. The clamps disclosed by this patent would not fit over a cloth or leather splash guard secured to the same bars as the clamps.

Another detachable windshield is disclosed in U.S. Pat. No. 7,360,819, issued to J. Hahne on Apr. 22, 2008. This detachable windshield utilizes a pair of docking mechanisms which completely surround the bar to which they are attached, leaving no provision for the passage of a cloth or leather splash guard.

Accordingly, there is a need for a detachable wind deflector that may be used in conjunction with presently existing cloth or fabric splash guards, extending upward from the crash bar a sufficient distance so that, in conjunction with the splash guards, the motorcyclist's legs are shielded from wind, water, mud, and other debris, without significantly altering the appearance of the motorcycle. Furthermore, there is a need for a detachable wind deflector that may be stowed in a saddlebag or other similar container when not in use.

SUMMARY

The above needs are met by a wind deflector having a generally planar, elongated shield body. At least one clamp is secured to the lower portion of the shield body. The clamp includes a lower body having a generally semicircular configuration, and an upper projection. The upper projection and shield body each define corresponding holes, allowing the shield body and clamp to be secured together by a bolt passing through the holes, and a threaded knob secured to the bolt.

The wind deflector may be secured to a motorcycle by loosening the threaded knob, placing the clamp around the top of the crash bar, and then tightening the knob. A cloth or leather splash guard, if present, may extend downward between the lower edge of the clamp and the shield body.

The features and advantages of the wind deflector will become more apparent through the following description and drawings.

BRIEF DESCRIPTION OF THE DRAWINGS

FIG. 5 is an outer end elevational view of a right side wind deflector of FIG. 2.

FIG. 6 is an environmental front view of a right side wind deflector of FIG. 2, secured to a crash bar of a motorcycle.

FIG. 7 is an environmental back view of a left side wind deflector of FIG. 1, secured to a crash bar of a motorcycle.

Like reference characters denote like elements throughout the drawings.

DETAILED DESCRIPTION

Figure 1:
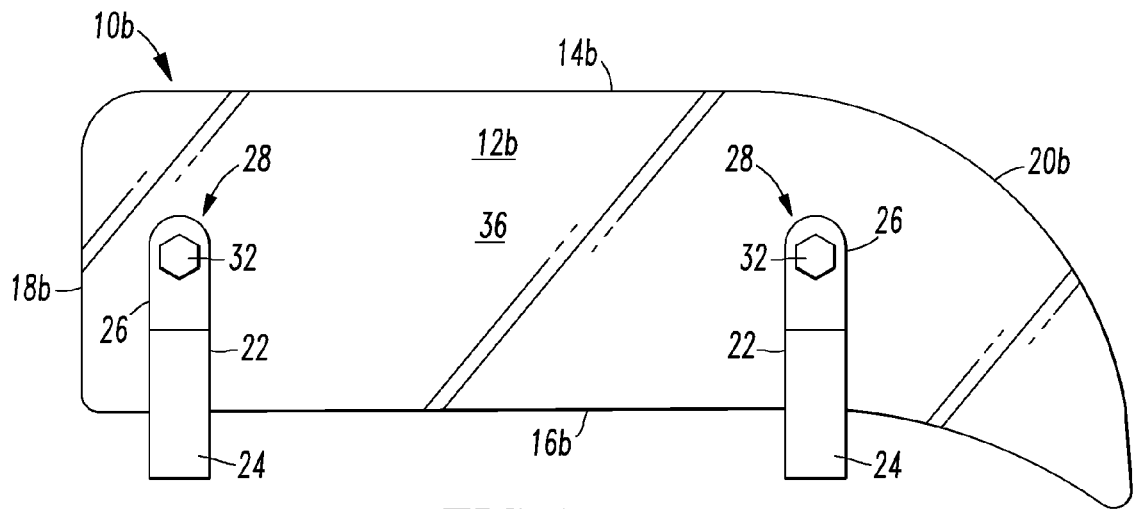
FIG. 1 is a front elevational view of a left side wind deflector.
Figure 2:
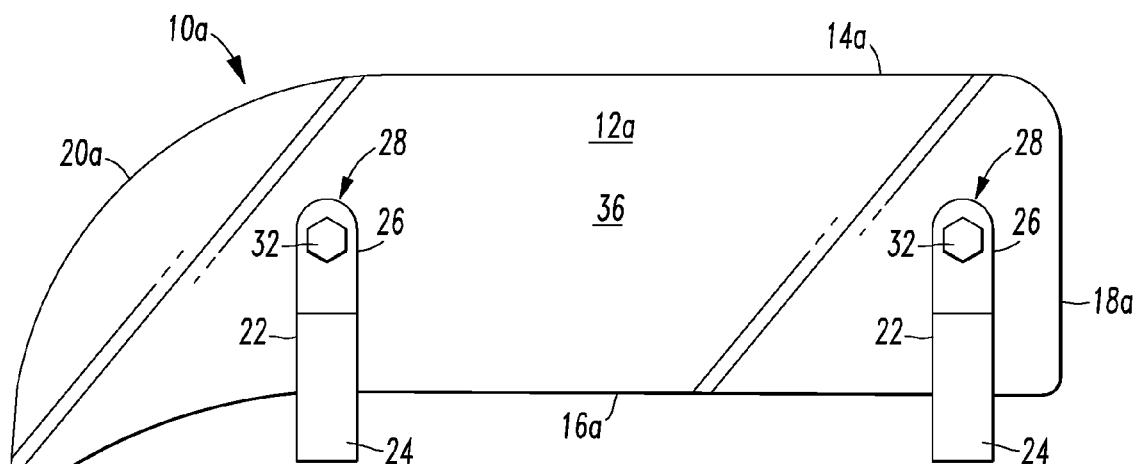
FIG. 2 is a front elevational view of a right side wind deflector.
Figure 3:
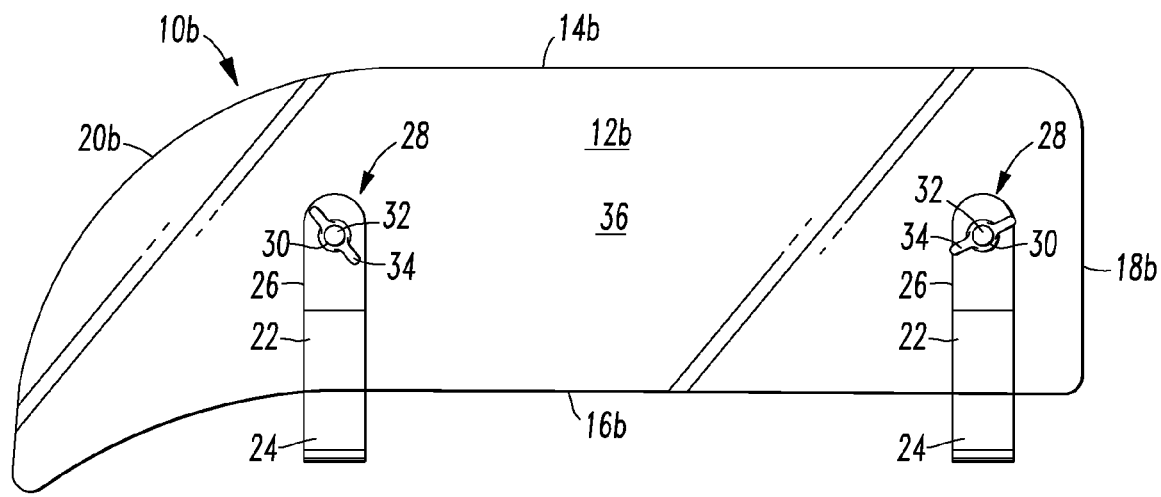
FIG. 3 is a back elevational view of a left side wind deflector of FIG. 1.
Figure 4:
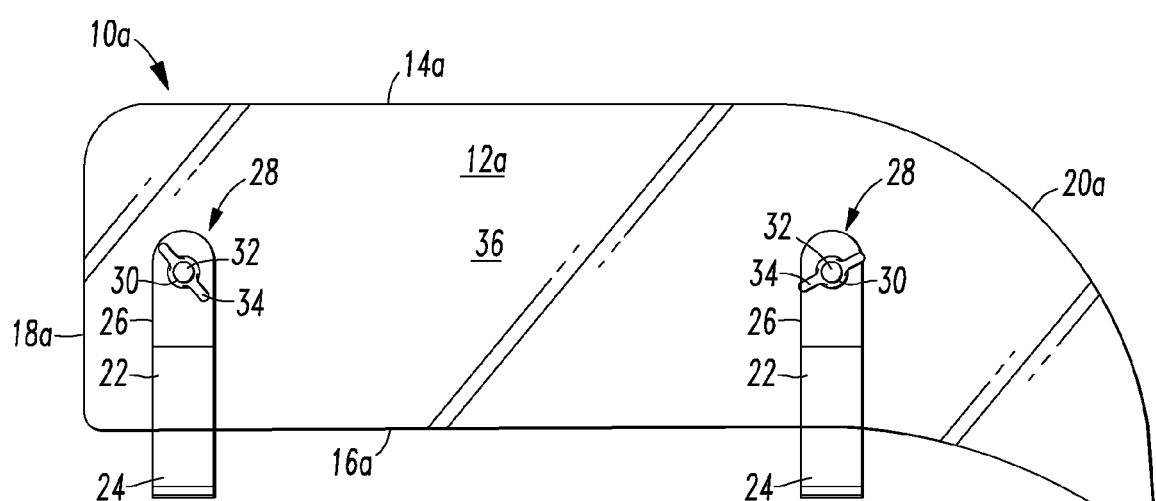
FIG. 4 is a back elevational view of a right side wind deflector of FIG. 2.

Referring to FIGS. 1-5, there is shown in example of a motorcycle wind deflector 10 for use in conjunction with a cloth or fabric splash guard such as the one disclosed in U.S. D438,496, the entire disclosure of which is expressly incorporated herein by reference. Throughout the drawings, reference characters followed by the letter "a" refer to a right side wind deflector, while reference characters followed by the letter "b" refer to a left side wind deflector. A reference character by itself refers to either the left or right when deflector. The right side wind deflector 10a is a mirror image of the left side wind deflector 10b.

Each wind deflector 10a, 10b includes a shield body 12a, 12b. Each shield body 12a, 12b includes an upper edge 14a, 14b, a lower edge 16a, 16b, an inside edge 18a, 18b, and an outside edge 20a, 20b. The shield body 12 may be made from any suitably strong material, including metal, plastic, vehicle safety glass, etc. In some examples, the shield body 12 may be transparent. In the illustrated example, the shield body 12 is made from transparent PLEXIGLAS. The illustrated lower edge 16 curves downward as it approaches the outside edge 20, following the general curvature of a motorcycle crash bar. Similarly, the upper edge 14 also curves downward as it approaches the outside edge 20. The distance between the inside edge 18 and outside edge 20 is approximately the same distance that the motorcycle crash bar extends away from the body of the motorcycle, and in some examples may be about 10 inches. The distance between the upper edge 14 and lower edge 16 is sufficient so that the portion of a motorcyclist's leg not protected by a splash guard such as the one disclosed in U.S. D438,496 is protected by the wind deflector 10. In some examples, the distance between the upper edge 14 and lower edge 16 may be about 4 inches to about 6 inches.

Each wind deflector 10a, 10b includes at least one clamp 22 secured in a lower portion of the shield body 12. In the illustrated example, two clamps 22 are provided on each wind deflector 10a, 10b. Each of the illustrated examples of the clamp 22 has a body portion that is formed from a single piece of appropriate material, such as metal. Each clamp 22 includes a lower body 24 having a generally semicircular configuration when viewed from one side, best illustrated in FIG. 5. The lower body 24 is structured to fit around a crash bar of a motorcycle. An upper projection 26 extends upward from the lower body 24, and has a generally planar configuration. A hole 28 is defined within the upper projection 26, and a corresponding hole 30 is defined in the shield body 12. A bolt 32 passes through each set of corresponding holes 28, 30. A threaded knob 34 is secured on the bolt 32, so that the upper projection 26 of the clamps 22 and the shield body 12 are captured between the head of the bolt 32 and the threaded knob 34. As used herein, a threaded knob 34 may be any device having an internal threads structured to fit the threads of the bolts, and an external grasping surface structure to facilitate turning the threaded knob 34 without the use of tools. Examples include not only knobs having a typical knob shape, but also wingnuts and the like. In the illustrated example, the clamps 22 are disposed on the front face of 36 of the shield body 12, and the threaded knob's 34 are disposed against the rear face 38 of the shield body 12.

In some examples of the wind deflector 10, the clamps 22 may be coated in order to inhibit corrosion, resist rust, and/or improve the appearance of the clamps. Such coatings may include, but are not limited to, rubber coatings, polymer coatings, paint, plating, anodizing, and the like.

Although it is not necessary to install the wind deflectors 10a, 10b over a splash guard, the wind deflectors 10a, 10b are particularly advantageous when used in conjunction with a cloth or leather splash guard. To install the wind deflectors 10a, 10b on a motorcycle, a splash guard 40, if desired, is first secured to the crash bar 42 on either side of a motorcycle 44 in a manner well known to those skilled in the art. Next, the threaded knobs 34 of each of the clamps 22 are loosened. The clamps 22 of the wind deflector 10a, 10b may now be placed over the top portion of the crash bar 42, as well as over the top portion of the splash guard 40. The knobs 34 are tightened until the wind deflector 10a, 10b is adequately secured in place, as shown in FIGS. 6-7. The process is repeated on the other side of the motorcycle 44. With the splash guards 40 and wind deflectors 10 in place, the motorcyclist's legs are protected from wind, water, mud, and other debris without altering the appearance of the motorcycle 44 in a manner that would be undesirable to many motorcyclists.

When it is not desired to have the wind deflectors 10a, 10b installed on the motorcycle 44, they may be removed from the crash bars by simply unscrewing the threaded knobs 34. The splash guards may also be removed if desired. Because of the size of the wind deflectors 10a, 10b, as well as the flexibility of the cloth or fabric splash guards, the entire wind deflector/splash guard system will fit within a saddlebag or other container that is typically found on a motorcycle.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A wind deflector for a motorcycle, comprising:
   a generally planar, elongated shield body, the shield body defining a front, a back, an upper side edge, a lower side edge, a lower portion, and a pair of ends;
   at least one clamp secured within the lower portion of the shield body, the clamp defining an upper projection and a lower body having a generally semicircular configuration when the shield is viewed from an end, the upper projection defining an opening therein, the opening being structured to align with an opening defined within the lower portion of the shield body to permit passage of a bolt therethrough, the lower body being structured to fit around a crash bar of a motorcycle; and
   a threaded knob threadedly secured to each bolt, the clamp and shield body being held together between the threaded knob and a head of the bolt, whereby a cloth or leather splash guard that is also secured to the crash bar is permitted to pass between a lower edge of the clamp and the shield body.

2. The wind deflector according to claim 1, wherein each clamp is secured to the front of the shield body, and each threaded knob is secured to the back of the shield body.

3. The wind deflector according to claim 1, wherein the lower side edge of the shield body curves downward at one end.

4. The wind deflector according to claim 1, wherein the shield body is transparent.

5. The wind deflector according to claim 1, wherein the upper side edge is structured to extend upward from a motorcycle crash bar to a position that is higher from the ground than a rider's knee.

6. A motorcycle, comprising:
   a crash bar;
   a splash guard secured to the crash bar;
   a wind deflector, comprising:
      a generally planar, elongated shield body, the shield body defining a front, a back, an upper side edge, a lower side edge, a lower portion, and a pair of ends;
      at least one clamp secured within the lower portion of the shield body, the clamp defining an upper projection and a lower body having a generally semicircular configuration when the shield is viewed from an end, the upper projection defining an opening therein, the opening being structured to align with an opening defined within the lower portion of the shield body to permit passage of a bolt therethrough, the lower body being structured to fit around a crash bar of a motorcycle; and
      a threaded knob threadedly secured to each bolt, the clamp and shield body being held together between the threaded knob and a head of the bolt, whereby a cloth or leather splash guard that is also secured to the crash bar is permitted to pass between a lower edge of the clamp and the shield body.

7. The motorcycle according to claim 6, wherein each clamp is secured to the front of the shield body, and each threaded knob is secured to the back of the shield body.

8. The motorcycle according to claim 6, wherein the lower side edge of the shield body curves downward at one end.

9. The motorcycle according to claim 6, wherein the shield body is transparent.

10. The motorcycle according to claim 6, wherein the upper side edge is structured to extend upward from a motorcycle crash bar to a position that is higher from the ground than a rider's knee.

* * * * *